(12) United States Patent
Gresham et al.

(10) Patent No.: US 9,167,058 B2
(45) Date of Patent: Oct. 20, 2015

(54) TIMESTAMP CORRECTION IN A MULTI-LANE COMMUNICATION LINK WITH SKEW

(71) Applicant: Xilinx, Inc., San Jose, CA (US)

(72) Inventors: Paul Gresham, Arnprior (CA); Jason Coppens, Ottawa (CA); Len Shimoon, Nepean (CA); Rolf Meier, Ottawa (CA); Bernard Bosi, Kanata (CA); David Kwong, Ottawa (CA); Mark A. Gustlin, Campbell (CA)

(73) Assignee: XILINX, INC., San Jose, CA (US)

( * ) Notice: Subject to any disclaimer, the term of this patent is extended or adjusted under 35 U.S.C. 154(b) by 291 days.

(21) Appl. No.: 13/846,683

(22) Filed: Mar. 18, 2013

(65) Prior Publication Data

US 2014/0269769 A1 Sep. 18, 2014

(51) Int. Cl.
*H04L 29/06* (2006.01)
*H04L 12/803* (2013.01)
*H04L 12/801* (2013.01)

(52) U.S. Cl.
CPC .............. *H04L 69/28* (2013.01); *H04L 47/125* (2013.01); *H04L 47/34* (2013.01)

(58) Field of Classification Search
None
See application file for complete search history.

(56) References Cited

U.S. PATENT DOCUMENTS

| | | | |
|---|---|---|---|
| 2004/0213155 A1* | 10/2004 | Xu et al. | 370/232 |
| 2005/0259754 A1 | 11/2005 | Ho et al. | |
| 2007/0286195 A1* | 12/2007 | Ilnickl et al. | 370/392 |
| 2009/0310729 A1* | 12/2009 | Liu et al. | 375/376 |
| 2012/0030438 A1* | 2/2012 | Shafai et al. | 711/159 |
| 2013/0343409 A1* | 12/2013 | Haulin | 370/503 |
| 2014/0092918 A1* | 4/2014 | Jost | 370/465 |
| 2014/0098684 A1* | 4/2014 | Diab et al. | 370/252 |

OTHER PUBLICATIONS

IEEE International Standard 1588, IEC 61588, IEEE 1588, Edition 2.0, Feb. 2009, Precision clock synchronization protocol for networked measurement and control systems, pp. 1-292.
Mendel, D. et al., "Packet Arrival Time in 1588 for 40GE/100GE", 2012 IEEE International Symposium on Precision Clock Synchronization for Measurement, Control and Communication Proceedings, Sep. 23-28, 2012, pp. 91-96.

* cited by examiner

*Primary Examiner* — Robert C Scheibel
(74) *Attorney, Agent, or Firm* — Kin-Wah Tong

(57) ABSTRACT

A method, non-transitory computer readable medium and apparatus for correcting a timestamp in a multi-lane communication link with a skew are disclosed. For example, the method receives a data packet, a time stamp for the data packet and a fill level for a lane of the multi-lane communication link carrying the data packet, calculates a corrected timestamp for the data packet and replaces the time stamp for the data packet with the corrected timestamp.

18 Claims, 4 Drawing Sheets

TIMESTAMP CORRECTION IN A MULTI-LANE COMMUNICATION LINK WITH SKEW

FIELD OF THE INVENTION

The present disclosure relates generally to multi-lane communication links (e.g., an Ethernet circuit) with a skew and, more particularly, to a method and apparatus for timestamp correction in a multi-lane communication link with skew.

BACKGROUND OF THE INVENTION

As digital communication links become increasingly faster, many technical difficulties arise. One of the factors limiting the speed of a communication channel is the property of the physical electrical link, which is usually constrained by the latest electrical and integrated circuit technology to be significantly less than the desired aggregate communication speed. Therefore, it is common practice to employ a number of parallel physical communication lanes to achieve a greater aggregate logical link speed. This is known as Multi-Lane Distribution (MLD).

A problem then arises as to how the number of physical communication lanes may be re-combined when the individual high-speed lanes have been impaired by various means during their propagation from a transmitter to a receiver. The arrival time difference of the various individual lanes needs to be corrected so that the individual bits may be correctly re-assembled into the prescribed order corresponding to the aggregate link prior to transmission. For example, the bits arriving on individual lanes may have skewed arrival times due to different lengths of wire or printed circuit board (PCB) trace. The slightly different timestamps can potentially cause variation in a slave clock.

An additional problem occurs when logical lanes are multiplexed over various different types of physical lanes, e.g., electrical lanes or optical lanes. As a logical lane moves from one physical lane to another (electrical or optical), the delay of that logical lane changes since the logical lane is constrained by the delay of the physical lane that the logical lane happens to be carried on.

SUMMARY OF THE INVENTION

A method for correcting a timestamp in a multi-lane communication link is disclosed. One embodiment of the method includes receiving a data packet, a time stamp for the data packet and a fill level for a lane of the multi-lane communication link carrying the data packet, calculating a corrected timestamp for the data packet and replacing the time stamp for the data packet with the corrected timestamp.

In various embodiments of the method the receiving, the calculating and the replacing are repeated for each lane of a plurality of lanes having a respective data packet in the multi-lane communication link; the time stamp corresponds to a time stamp of a start of the data packet; the time stamp is captured after a gearbox module for each clock cycle in a serialize/deserialize clock domain; the fill level comprises a measure of one or more bits; the fill level is calculated via a first-in-first-out buffer for each lane of a plurality of lanes in the multi-lane communication link based upon a time average of a read pointer in a first clock domain and a write pointer in a second clock domain; the calculating is a function of the time stamp, the fill level of the lane and a reference fill level; the reference fill level comprises a minimum fill level; the reference fill level comprises a maximum fill level; the reference fill level comprises an average fill level; the time stamp, the fill level of the lane and the reference fill level are each converted into a unit of clock cycles; and the time stamp, the fill level of the lane and the reference fill level are each converted into a unit of nanoseconds.

According to another embodiment, an integrated circuit, comprises: a demultiplexer and gearbox module for dividing an input signal into a plurality of lanes, wherein each lane carries at least one data packet, a time stamp capture module for capturing a timestamp for each of the at least one data packet, a lane align buffer for generating a fill level for each of the plurality of lanes, and a correction logic module for receiving the at least one data packet, the time stamp for the at least one data packet and the fill level for each lane of the plurality of lanes carrying the at least one data packet, for calculating a corrected timestamp for the at least one data packet, and for replacing the time stamp for the at least one data packet with the corrected timestamp.

In various embodiments of the integrated circuit, the correction logic calculates the corrected timestamp as a function of the time stamp, the fill level of a lane of the plurality of lanes carrying at least one data packet and a reference fill level; the reference fill level comprises a minimum fill level; the reference fill level comprises a maximum fill level; the reference fill level comprises an average fill level; the correction logic module converts the time stamp, the fill level of the lane and the reference fill level into a unit of clock cycles to perform the calculating; the correction logic module converts the time stamp, the fill level of the lane and the reference fill level into a unit of nanoseconds to perform the calculating According to another embodiment, a non-transitory computer-readable medium storing a plurality of instructions which, when executed by a processor, cause the processor to perform operations for correcting a timestamp in a multi-lane communication link is provided. The operations of non-transitory computer readable medium includes receiving a data packet, a time stamp for the data packet and a fill level for a lane of the multi-lane communication link carrying the data packet, calculating a corrected timestamp for the data packet and replacing the time stamp for the data packet with the corrected timestamp.

BRIEF DESCRIPTION OF THE DRAWINGS

Accompanying drawings show exemplary embodiments in accordance with one or more aspects of the disclosure; however, the accompanying drawings should not be taken to limit the disclosure to the embodiments shown, but are for explanation and understanding only.

To facilitate understanding, identical reference numerals have been used, where possible, to designate identical elements that are common to the figures.

DETAILED DESCRIPTION OF THE DRAWINGS

The present disclosure broadly discloses a method, non-transitory computer readable medium and apparatus for correcting a timestamp in a multi-lane communication link with a skew. As discussed above, in a multi-lane communication channel, the start of a particular packet may occur on any lane. Since each lane can have a different delay, also known as skew, each lane will present slightly different timestamps, which potentially can cause variation in a slave clock.

One embodiment of the present disclosure accounts for the relative delay in each lane by means of a small buffer which is sized to equalize the expected relative delay. Then the relative amount of data stored in each per-lane buffer is used to infer a correction which is applied to the timestamp. Thus, the accuracy of the slave clock is improved.

Figure 1:
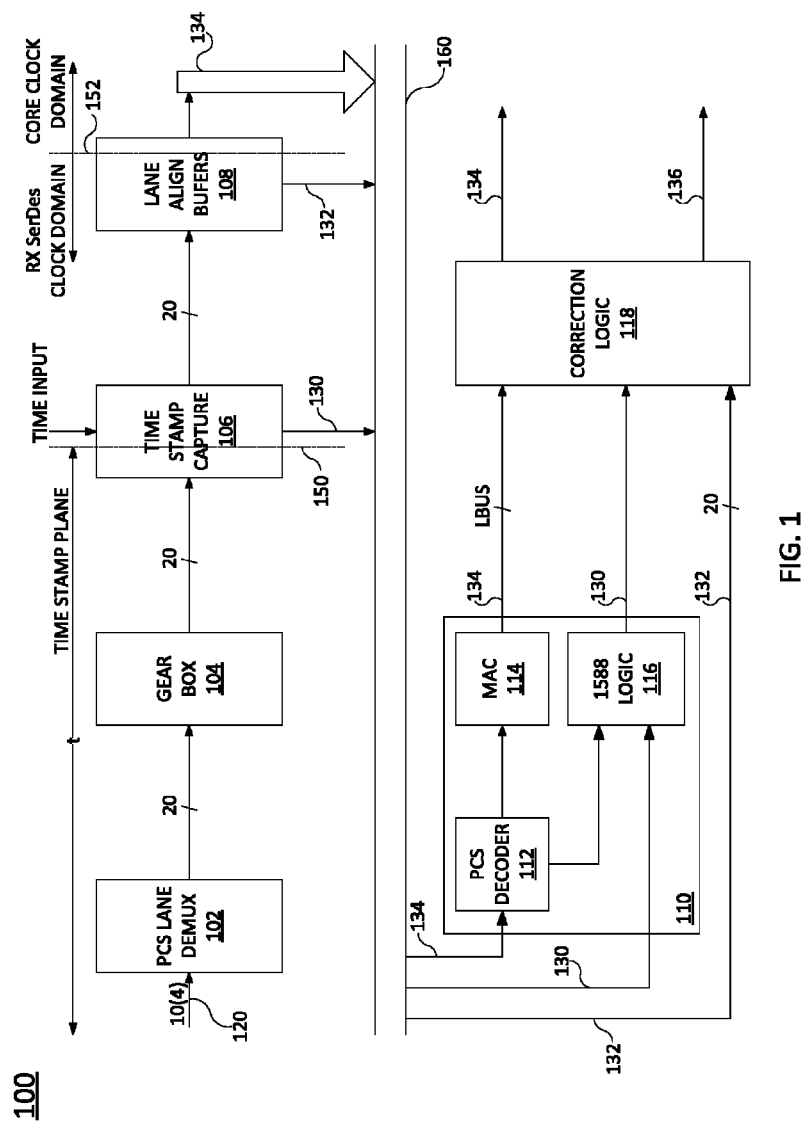
FIG. 1 illustrates one example of a block circuit diagram for correcting a timestamp in a multi-lane communication link with a skew.

FIG. 1 illustrates a block diagram of one example of a block circuit diagram 100 for correcting a timestamp in a multi-lane communication link with skew. In one embodiment, the block circuit diagram 100 illustrates a receiver portion of the multi-lane communication link. In other words, the block circuit diagram 100 may be part of a larger network having a transmission portion and a receiver portion. In one embodiment, although skew is attributable throughout the system (e.g., in the transmitter portion and the receiver portion), the skew is only being addressed in the receiver portion. As a result, the receiver portion is illustrated for the purpose of describing the embodiments of the present disclosure.

In one embodiment, the multi-lane communication link may be an Ethernet line interface. For example, the Ethernet line interface may be a 40 gigabit Ethernet (GBE) or a 100 GBE. The present disclosure is described herein with reference to a 100 GBE but it should be noted that the present disclosure may be applied to any multi-lane communication link.

In one embodiment, an input 120 may be received by a physical coding sub-layer (PCS) lane demultiplexer (DE-MUX) 102 and a gearbox module 104. For a 100 GBE, the input 120 may comprise 10 lanes striped across 4×25 GBE lanes. The demultiplexer and gearbox may then generate 20 virtual lanes of 5 GBE each. Although the demultiplexer and gearbox are illustratively shown as separate modules, the functions or operations performed by these two modules can be implemented into a single module.

In one embodiment, a timestamp for each data packet in each lane may be captured after the gearbox 104 in a timestamp capture module 106. Timestamps may be determined according to a "time input" signal of the timestamp capture module 106. The "time input" may be a clock which represents real time. In one embodiment, the "time input" signal may be an 80-bit value consisting of seconds and nanoseconds in pre-defined fields and in a pre-defined format, encoding and epoch. In one embodiment, the "time input" varies continually.

In one embodiment, the timestamp may be captured after the demultiplexer and gearbox for each clock cycle of the serialize/deserialize (SerDes) clock demarcated by a dashed line 152. In one embodiment, this is the timestamp that is used to calculate a corrected timestamp, as discussed below in further detail. It should be noted that any arbitrary demultiplexer and gearbox may be used to capture the timestamp as long as the same one is used consistently.

In one embodiment, time "t" represents the time between the capture point and an arbitrary reference plane 150. In one embodiment, since the transfer time of data from the SerDes to the gearbox is known, time "t" may be subtracted from the timestamp so as to refer the timestamp to the reference plane 150. In one embodiment, the timestamp for each one of the lanes may be sent via line 130 to a core logic 110 via a communication bus 160.

In one embodiment, the data packets in each one of the 20 lanes are passed to the lane align buffer 108. In one embodiment, the lane align buffer may be a first-in-first-out (FIFO) memory buffer. In one embodiment, the lane align buffer 108 includes a FIFO memory buffer for each lane of the multi-lane communication link.

In one embodiment, each FIFO memory buffer may have a fill level that is calculated or predetermined. The fill level may comprise one or more bits that are used to compensate for any skew (e.g., time delay) relative to other lanes within the multi-lane communication link. In one embodiment, the fill level for each lane, a reference fill level and the timestamp may be used to calculate a corrected timestamp for the data packet.

Figure 2:
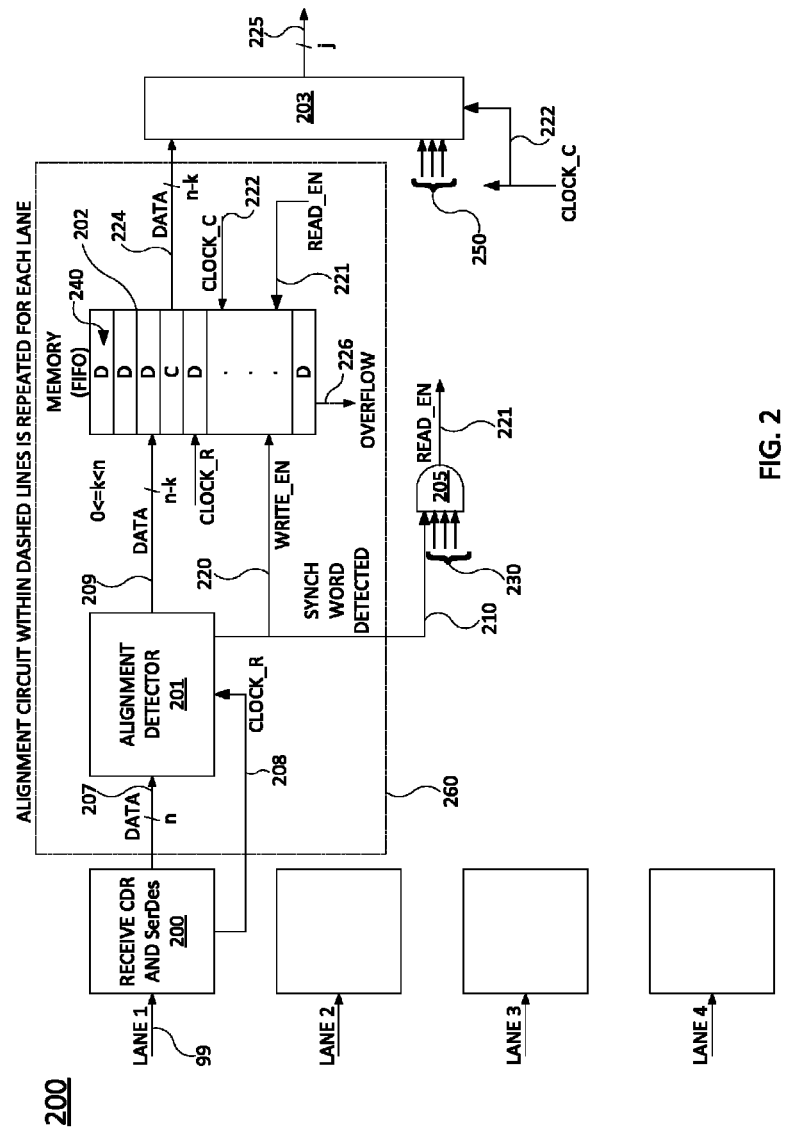
FIG. 2 illustrates one example of an alignment logic calculating a fill level for each lane of the multi-lane communication link.

FIG. 2 illustrates one example of an alignment logic and how the fill level may be calculated for each lane of the multi-lane communication link. At a high level, the fill level for each lane may be determined by a time average of a read pointer which generates Read_En 221 and write pointer which generates Write_En 220, which may be on different clock domains Clock_R 208 and Clock_C 222.

Referring to FIG. 2 in more detail, each of four lanes 99 terminates in its own receiving SerDes 200, each of which includes a known circuit to recover a Clock_R 208 and Data 207 as well as a known demuxing circuit, which converts each serial lane to n parallel lines. While the example illustrates four lanes, it is to be understood that the present disclosure is not limited by the number of lanes. An alignment detector 201 and a memory 202, which will now be described, is repeated for each lane, although it will be understood that they could be implemented in software as part of a common system. In one embodiment, the memory 202 is similar to the lane align buffer 108 illustrated in FIG. 1.

Data 207 is transferred to an Alignment Detector circuit 201 which performs at least one of the following functions: determine word boundary; invert bits as required; descramble; a 32-bit cyclic redundancy check (CRC32); identify a bit pattern employed for synchronization and produce an indication of the presence of that bit pattern. In some embodiments, functions such as descramble and CRC32 are not required in the alignment detector, for example in the case of 802.3ba Ethernet. In some embodiments, identification of the bit synchronization bit pattern requires that the pattern be detected more than once, for example four times in the instance of the Interlaken protocol. Signal 210, "Synch Word Detected", is assigned a value TRUE when the synchronization pattern has been reliably detected. The reliable detection of a synchronization word in some embodiments is required to occur at least once, for example four times in the case of the Interlaken protocol. In the event that the synchronization pattern is not detected reliably, the Synch Word Detected signal 210 is assigned a value FALSE. In some embodiments the unreliable detection of the synchronization pattern occurs after more than one error of detection, for example four times in the instance of the Interlaken protocol.

The condition of signal 210 having a TRUE value will cause Clock_R to write the Data 209 into the FIFO memory 202 as a result of the Write_En signal 220 being asserted. In some embodiments, the Synch Word may be known by various other names, such as for example, an Alignment pattern or unnamed but performing the same function, namely to provide a means of correcting for the skewed arrival time of data on the various lanes.

Data is written into FIFO 202 in order beginning with the first valid data word after the Synch Word at the first memory location 240, which is designated by the letter "D". Subsequent received data is then sequentially written into the FIFO as it is received, and may contain various information such as data (D) or control information (C).

The receiver for each lane contains a duplicate of the Alignment Detector circuit 201 each with an output corresponding to the detection of a Synch Word signal 210 shown as the collected signals 230 as well as a duplicate of the FIFO memory 202. When the condition of all the detect signals being TRUE has occurred, circuit 205 produces a TRUE output signal 221 (e.g., Read_En signal), which is presented to all four FIFO circuits at their respective output logic simultaneously. When Read_En signal 221 is TRUE, then Clock_C 222 is active to read Data 224 in the same order in which it was stored in FIFO 202.

Following this procedure, it is ensured that Data 224 for each of the four lanes is aligned in time such that the skew has been eliminated. The output circuit 203 receives data 250 in parallel from all of the lanes at the correct time because Read_En 221 is distributed to the output port of each FIFO. In some embodiments, circuit 203 receives data 250 from less than the total number of lanes, for example in the event of a failure on one or more lanes. The circuit 203 may also be programmed to read less than the total number of lanes if the total traffic may be supported by fewer lanes, in which case the unused lanes may be shut down in order to conserve electrical power.

After additional processing by the circuit 203 the deskewed data is then available to other circuits for subsequent processing or transmission on data link 225 comprising of j physical lines where j is at least 1. It is noted that Clock_C is not required to be the same frequency as Clock_R provided that data can be read from the FIFO at a rate such that the FIFO does not overflow. It will be observed therefore that this method may perform the function of clock domain adaptation with no additional circuitry. In the event that the FIFO 202 runs out of memory locations prior to being read out, Overflow signal 226 is set to a value of TRUE. Under normal operating conditions, the case of Overflow=TRUE will not occur due to the requirement that f(Clock_C)>=f(Clock_R). However, in the event that glitches or other external errors cause FIFO overflow, this signal is available to be used to take corrective action such as causing logic to be reset or raising an alarm.

Referring back to FIG. 1, once the fill level for each of the lanes is calculated or determined, the fill levels for each lane may be sent via line 132 to the core logic module 110 via the communication bus 160. In addition, the data packets may be sent via line 134 to the core logic module 110 via the communication bus 160.

In one embodiment, the core logic module 110 may include a physical coding sub-layer (PCS) decoder 112, a media access controller (MAC) 114 and a 1588 logic module 116. In one embodiment, the data packets may be fed to the PCS decoder 112 for decoding. In one embodiment, the PCS decoder 112 may identify a Start of a Packet (SOP) and a lane associated with each SOP.

In one embodiment, the 1588 logic module 116 may receive the SOP, the lane associated with each SOP from the PCS decoder 112 and the timestamps from the time stamp capture 106. In one embodiment, the 1588 logic module 116 may comprise a logic module that is looking for a particular timestamp as defined by IEEE 1588. In particular, the 1588 logic module 116 may be looking for a timestamp associated with the SOP.

In one embodiment, the 1588 logic module 116 may identify a timestamp with the SOP. The timestamp of the SOP is the timestamp that is used to calculate the corrected timestamp. Any other timestamps received by the 1588 logic module 116 are discarded.

In one embodiment, the fill levels for each lane of the lane align buffer 132 is passed through the core logic module 110 without processing. In one embodiment, the logic bus (LBUS) receives as outputs the packet data (e.g., 512 bits). The LBUS then passes this information to a correction logic module 118 that may calculate the corrected timestamp for the data packet of each one of the lanes in the multi-lane communication link. The correction logic module 118 also receives a timestamp for the arrival time of the SOP from the 1588 logic module and the fill level associated with each one of the lanes from the lane align buffers 108.

In one embodiment, the correction logic module 118 may calculate the corrected time stamp as a function of the timestamp of the data packet (e.g., the SOP), a fill level for the lane carrying the data packet and a reference fill level. In one embodiment, the reference fill level may be a minimum fill level (e.g., the lowest fill level of all of the lanes), a maximum fill level (e.g., a highest fill level of all of the lanes) or an average fill level (e.g., a sum of the fill levels divided by the total number of lanes).

In one embodiment, the fill level of the lane and the reference fill level may be a positive or a negative number. For example, whether the fill level and/or the reference fill level is a positive or a negative number may depend on whether the fill level of the lane is positive or negative with respect to the reference fill level.

In one embodiment, the correction logic module 118 calculates the corrected timestamp by adjusting the timestamp by the fill level of the lane and the reference fill level. In one embodiment, the following equation may be used:

$$\text{Corrected Timestamp} = \text{timestamp} +/- \text{fill level of the lane} +/- \text{reference fill level} \quad \text{Equation (1)}$$

In one embodiment, the correction logic module 118 may convert all of the values into a common unit such that the calculation may be consistent. For example, the fill level of the lane and the reference fill level may be a number of bits. The correction logic module 118 may convert the number of bits of the fill level and the reference level into a unit of clock cycles or nanoseconds based upon a known number of bits per clock cycle and a frequency of the clock cycles. For example, if the circuit 100 read 66 bits/clock cycle and the circuit 100 has 2.1 clock cycles per nanosecond, the corrected time stamp could be calculated in terms of either clock cycles or nanoseconds.

In one embodiment, once the corrected timestamps are calculated, the timestamp for each one of the data packets in each one of the lanes may be replaced with the corrected timestamp. As a result, timestamps in each of the multi-lane communication link would be corrected with respect to skew. Consequently, the problems described above with variation in the slave clock due to the skew may be resolved by the present disclosure.

Figure 3:
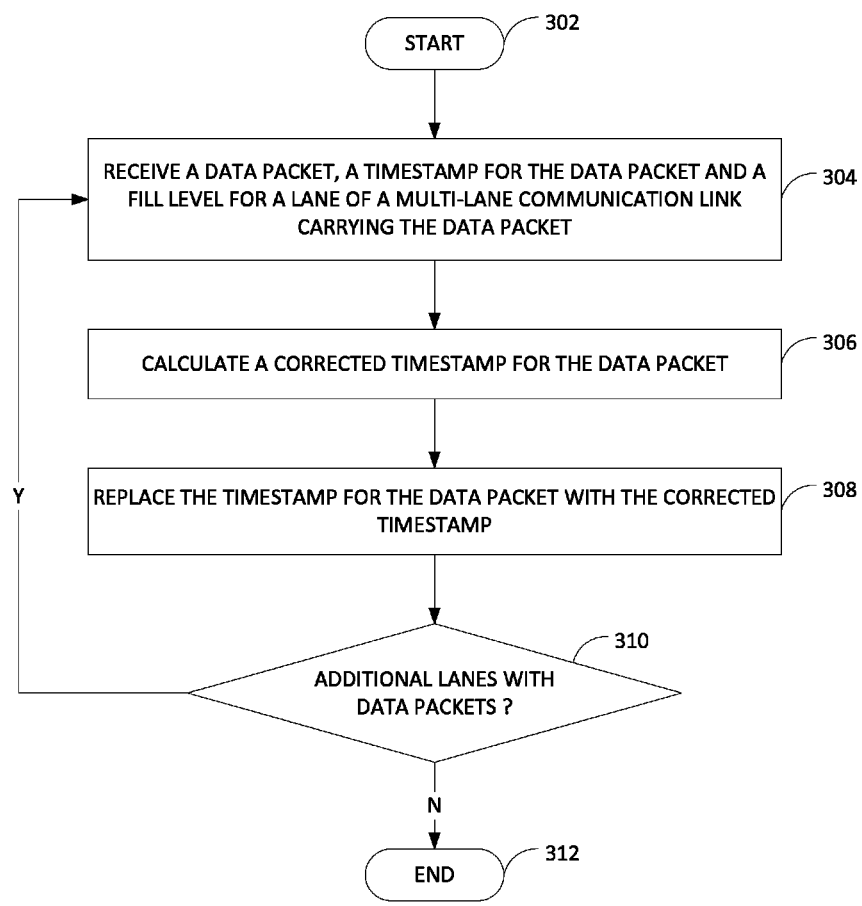
FIG. 3 illustrates an example flowchart of one embodiment of a method for correcting the timestamp in the multi-lane communication link with the skew.
Figure 4:
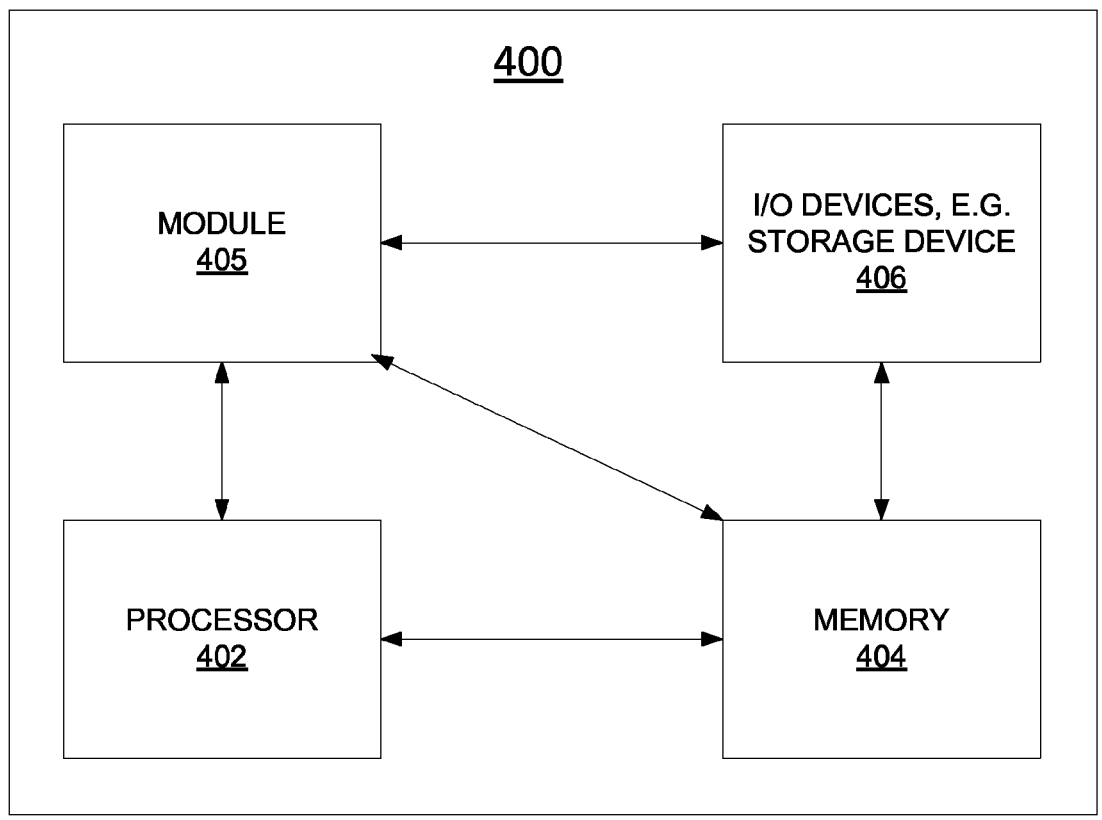
FIG. 4 illustrates a high-level block diagram of a general-purpose computer suitable for use in performing the functions described herein.

FIG. 3 illustrates a flowchart of a method 300 for correcting a timestamp in a multi-lane communication link with a skew. In one embodiment, the method 300 may be performed by a general purpose computer (or any other hardware equivalent device) as illustrated in FIG. 4, and discussed below or the correction logic 118 implemented as a logical circuit or a programmable integrated circuit as discussed above.

The method 300 begins at step 302. At step 304, the method 300 receives a data packet, a timestamp for the data packet and a fill level for a lane of a multi-lane communication link carrying the data packet. For example, a correction logic module may receive the data packet, the timestamp for the data packet and the fill level for a lane of the multi-lane communication link carrying the data packet.

In one embodiment, the timestamp may be filtered by a 1588 logic module, e.g., the timestamp is associated with a Start of Packet (SOP). All other timestamps may be discarded.

In one embodiment, the correction logic module may receive the fill level for all of the lanes in the multi-lane communication link carrying the data packet. The fill level for all of the lanes may be used to select or calculate a reference fill level. In one embodiment, the reference fill level may be a minimum fill level of all of the fill levels, a maximum fill level of all of the fill levels or an average fill level of all of the fill levels.

At step 306, the method 300 calculates a corrected timestamp for the data packet. In one embodiment, the correction logic module may calculate the corrected timestamp by adjusting the timestamp by the fill level of the lane and the reference fill level. In one embodiment, the fill level of the lane and the reference fill level may be a positive or a negative number. For example, whether the fill level and/or the reference fill level is a positive or a negative number may depend on whether the fill level of the lane is positive or negative with respect to the reference fill level. In one embodiment, Equation (1) may be used to calculate the corrected timestamp.

In one embodiment, the correction logic module may convert all of the values into a common unit such that the calculation may be consistent. For example, the fill level of the lane and the reference fill level may be a number of bits. The correction logic module may convert the number of bits of the fill level and the reference level into a unit of clock cycles or nanoseconds based upon a known number of bits per clock cycle and a frequency of the clock cycles. For example, if the circuit 100 read 66 bits/clock cycle and the circuit 100 has 2.1 clock cycles per nanosecond, the corrected time stamp could be calculated in terms of either clock cycles or nanoseconds.

At step 308, the method 300 replaces the timestamp for the data packet with the corrected timestamp. For example, the timestamp for the SOP may be replaced with the corrected timestamp.

At step 310, the method 300 determines if any there are any additional lanes with data packets that need to have the timestamp corrected. If the answer to step 310 is affirmative, the method returns to step 304 and repeats steps 304, 306 and 308. In other words, the method 300 may be repeated for each lane of a plurality of lanes having a respective data packet in the multi-lane communication link.

For example after the method 300 is repeated for each lane of the multi-link communication packet, the timestamp for each SOP in each lane of the multi-lane communication link may be replaced with the corrected timestamp. Consequently, accuracy of the slave clock is improved.

If the answer to step 310 is negative, then the timestamp for each of the data packets in each one of the lanes has been corrected. The method proceeds to step 312 where the method 300 ends.

It should be noted that although not explicitly specified, one or more steps, blocks, or functions of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks, or functions in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a hardware processor element 402 (e.g., a CPU), a memory 404, e.g., random access memory (RAM) and/or read only memory (ROM), a module 405 for correcting a timestamp in a multi-lane communication link with a skew of an integrated circuit (IC), e.g., a programmable integrated circuit and the like, and various input/output devices 406, e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a programmable integrated circuit (IC) such as a FPGA, a general purpose computer or any other hardware equivalents, e.g., computer readable instructions pertaining to the method(s) discussed above can be used to configure a hardware processor to perform the steps or functions of the above disclosed method. In one embodiment, the present module or process 405 for correcting a timestamp in a multi-lane communication link with a skew, e.g., a programmable integrated circuit can be loaded into memory 404 and executed by hardware processor 402 to implement the functions as discussed above. As such, the present process 405 for correcting a timestamp in a multi-lane communication link with a skew for an IC, e.g., a programmable integrated circuit as discussed above in method 300 (including associated data structures) of the present disclosure can be stored on a non-transitory (e.g., tangible or physical) computer readable storage medium, e.g., RAM memory, magnetic or optical drive or diskette and the like.

Embodiments of the present disclosure may also be implemented in whole or in part by a tunable IC, e.g., a programmable integrated circuit. More specifically, a programmable integrated circuit is a general-purpose device that can be programmed by a user to implement a variety of selected functions. A programmable integrated circuit may include an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the programmable integrated circuit and/or to receive input signals from the external programmable integrated circuit pins. The programmable integrated circuit also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the programmable integrated circuit. A programmable integrated circuit may also include other programmable and non-programmable resources. As such, the circuits shown above in connection with FIGS. 1-2 may be implemented in a plurality of CLBs that perform equivalent logic operations of any one or more components of any one or more of the circuits of FIGS. 1-2. Thus, in one embodiment the system 400 can be configured to generate the necessary configuration data/instructions to configure a programmable integrated circuit to perform the various functions as disclosed above.

While the foregoing describes exemplary embodiments in accordance with one or more aspects of the present disclosure, other and further embodiments in accordance with the one or more aspects of the present disclosure may be devised without departing from the scope thereof, which is determined by the claims that follow and equivalents thereof. Claims listing steps do not imply any order of the steps. Trademarks are the property of their respective owners.

What is claimed is:

1. A method for correcting for skew in a multi-lane communication link having a plurality of lanes, comprising:
   receiving a data packet, a time stamp for the data packet and a fill level for a lane of the plurality of lanes that is carrying the data packet;
   calculating a corrected timestamp for the data packet as a function of at least the time stamp, the fill level, and a reference fill level that is derived from respective fill levels for all of the plurality of lanes;
   replacing the time stamp for the data packet with the corrected timestamp; and
   assembling a plurality of packets including the data packet in a prescribed order in a buffer, using the corrected timestamp, wherein the plurality of packets is received over the plurality of lanes.

2. The method of claim 1, wherein the receiving, the calculating and the replacing are repeated for each lane of the plurality of lanes having a respective data packet.

3. The method of claim 1, wherein the time stamp corresponds to a time stamp of a start of the data packet.

4. The method of claim 1, wherein the time stamp is captured for each clock cycle in a serialize/deserialize clock domain after a gearbox that divides an input signal including the data packet into the plurality of lanes.

5. The method of claim 1, wherein the fill level comprises a measure of one or more bits.

6. The method of claim 1, wherein the fill level is calculated via a first-in-first-out buffer for each lane of the plurality of lanes based upon a time average of a read pointer in a first clock domain and a write pointer in a second clock domain.

7. The method of claim 1, wherein the reference fill level comprises a lowest fill of all of the respective fill levels.

8. The method of claim 1, wherein the reference fill level comprises a highest fill level of all of the respective fill levels.

9. The method of claim 1, wherein the reference fill level comprises an average fill level calculated from all of the respective fill levels.

10. The method of claim 1, wherein the time stamp, the fill level of the lane and the reference fill level are each converted into a unit of clock cycles.

11. The method of claim 1, wherein the time stamp, the fill level of the lane and the reference fill level are each converted into a unit of nanoseconds.

12. An integrated circuit, comprising:
    a demultiplexer and gearbox module circuit for dividing an input signal into a plurality of lanes, wherein each lane carries at least one data packet;
    a time stamp capture module circuit for capturing a timestamp for each of the at least one data packet;
    a lane align buffer for generating a fill level for each of the plurality of lanes; and
    a correction logic module circuit for receiving the at least one data packet, the time stamp for the at least one data packet and the fill level for each lane of the plurality of lanes carrying the at least one data packet, for calculating a corrected timestamp for the at least one data packet as a function of at least the time stamp, the fill level of a lane of the plurality of lanes carrying at least one data packet, and a reference fill level that is derived from respective fill levels for all of the plurality of lanes, for replacing the time stamp for the at least one data packet with the corrected timestamp, and for assembling a plurality of packets including the at least one data packet in a prescribed order in the lane align buffer, using the corrected timestamp, wherein the plurality of packets is received over the plurality of lanes.

13. The integrated circuit of claim 12, wherein the reference fill level comprises a lowest fill of all of the respective fill levels.

14. The integrated circuit of claim 12, wherein the reference fill level comprises a highest fill level of all of the respective fill levels.

15. The integrated circuit of claim 12, wherein the reference fill level comprises an average fill level calculated from all of the respective fill levels.

16. The integrated circuit of claim 12, wherein the correction logic module circuit converts the time stamp, the fill level of the lane and the reference fill level into a unit of clock cycles to perform the calculating.

17. The integrated circuit of claim 12, wherein the correction logic module circuit converts the time stamp, the fill level of the lane and the reference fill level into a unit of nanoseconds to perform the calculating.

18. A non-transitory computer-readable medium storing a plurality of instructions which, when executed by a processor, cause the processor to perform operations for correcting for skew in a multi-lane communication link having a plurality of lanes, the operations comprising:
    receiving a data packet, a time stamp for the data packet and a fill level for a lane of the plurality of lanes that is carrying the data packet;
    calculating a corrected timestamp for the data packet as a function of at least the time stamp, the fill level, and a reference fill level that is derived from respective fill levels for all of the plurality of lanes;
    replacing the time stamp for the data packet with the corrected timestamp; and
    assembling a plurality of packets including the data packet in a prescribed order in a buffer, using the corrected timestamp, wherein the plurality of packets is received over the plurality of lanes.

* * * * *